(12) United States Patent
Goddard et al.

(10) Patent No.: US 9,921,380 B2
(45) Date of Patent: Mar. 20, 2018

(54) COMPOSITE CABLE

(71) Applicant: OFS Fitel, LLC, Norcross, GA (US)

(72) Inventors: Timothy Goddard, Newnan, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/076,738

(22) Filed: Mar. 22, 2016

(65) Prior Publication Data
US 2017/0276890 A1    Sep. 28, 2017

(51) Int. Cl.
G02B 6/44    (2006.01)

(52) U.S. Cl.
CPC ........... *G02B 6/4404* (2013.01); *G02B 6/441* (2013.01); *G02B 6/443* (2013.01)

(58) Field of Classification Search
CPC .................................. G02B 6/44; G02B 6/4404
USPC ....................................................... 385/105
See application file for complete search history.

(56) References Cited

U.S. PATENT DOCUMENTS

| | | | | |
|---|---|---|---|---|
| 5,121,901 A * | 6/1992 | Cassidy | ............... | G02B 6/4438 254/134.3 FT |
| 5,517,591 A * | 5/1996 | Wagman | ............... | G02B 6/4408 385/105 |
| 5,608,832 A * | 3/1997 | Pfandl | ............... | G02B 6/4403 385/105 |
| 5,638,478 A * | 6/1997 | Iwakura | ............... | G02B 6/4408 385/104 |
| 5,751,881 A * | 5/1998 | Konda | ............... | G02B 6/4408 385/103 |
| 6,243,523 B1 * | 6/2001 | Aloisio | ............... | C03C 25/106 385/128 |
| 6,345,916 B1 * | 2/2002 | Yui | ............... | G02B 6/3652 385/147 |
| 6,415,090 B1 * | 7/2002 | Taylor | ............... | C03C 25/1005 385/128 |
| 7,043,125 B2 * | 5/2006 | Diep | ............... | G02B 6/02014 385/123 |
| 7,082,243 B2 * | 7/2006 | Bickham | ............... | G02B 6/02019 385/127 |
| 7,742,667 B2 * | 6/2010 | Paschal | ............... | G02B 6/443 385/101 |
| 2002/0041744 A1 * | 4/2002 | Anelli | ............... | G02B 6/4433 385/112 |
| 2005/0013573 A1 * | 1/2005 | Lochkovic | ............... | G02B 6/4402 385/128 |
| 2005/0031283 A1 * | 2/2005 | Fabian | ............... | C03C 25/1065 385/128 |
| 2005/0207715 A1 * | 9/2005 | Roba | ............... | G02B 6/02395 385/128 |
| 2006/0072889 A1 * | 4/2006 | Roba | ............... | C03C 25/106 385/128 |
| 2007/0274647 A1 * | 11/2007 | Pizzorno | ............... | G02B 6/441 385/113 |
| 2009/0175583 A1 * | 7/2009 | Overton | ............... | C03C 13/046 385/100 |

(Continued)

*Primary Examiner* — Kaveh C Kianni
(74) *Attorney, Agent, or Firm* — Sam S. Han, Esq.

(57) ABSTRACT

An optical fiber cable comprising a stack of optical fiber ribbons. The stack comprises corner fibers at the corners of the stack, edge fibers the edges of the stack, and internal fibers that are internal to the stack. The corner fibers have a higher tolerance to fiber bending (or lower sensitivity to bending) than the internal fibers.

10 Claims, 1 Drawing Sheet

(56) References Cited

U.S. PATENT DOCUMENTS

| | | | | |
|---|---|---|---|---|
| 2010/0119202 A1* | 5/2010 | Overton | ............ | G02B 6/02395 |
| | | | | 385/141 |
| 2010/0135625 A1* | 6/2010 | Overton | ............... | C03C 25/106 |
| | | | | 385/114 |
| 2011/0110635 A1* | 5/2011 | Toge | ................... | G02B 6/4403 |
| | | | | 385/102 |
| 2011/0135259 A1* | 6/2011 | Guenter | ............ | G02B 6/02342 |
| | | | | 385/103 |
| 2012/0120389 A1* | 5/2012 | Logan | ............... | G01D 5/35345 |
| | | | | 356/73.1 |
| 2013/0156377 A1* | 6/2013 | DeMeritt | ............ | G02B 6/3885 |
| | | | | 385/59 |

\* cited by examiner

COMPOSITE CABLE

BACKGROUND

Field of the Disclosure

The present disclosure relates generally to fiber optics and, more particularly, to fiber-optic cables.

Description of Related Art

Optical fibers are susceptible to both macro-bending losses and micro-bending losses. Variations in optical fiber cabling affect both micro-bending and macro-bending sensitivity. Consequently, many competing factors must be considered when altering a structure of fiber-optic cable. This is because even minor variations in cable structure can adversely affect attenuation characteristics, thereby resulting in failure during mechanical testing or environmental testing.

SUMMARY

The present disclosure teaches optical fiber cables comprising a stack of optical fiber ribbons. The stack comprises corner fibers at the corners of the stack, edge fibers the edges of the stack, and internal fibers that are internal to the stack. Different types of fibers are used within the fiber-optic cable such that the corner fibers have a higher tolerance to fiber bending (or lower sensitivity to bending) than the internal fibers.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figures 1, 2:
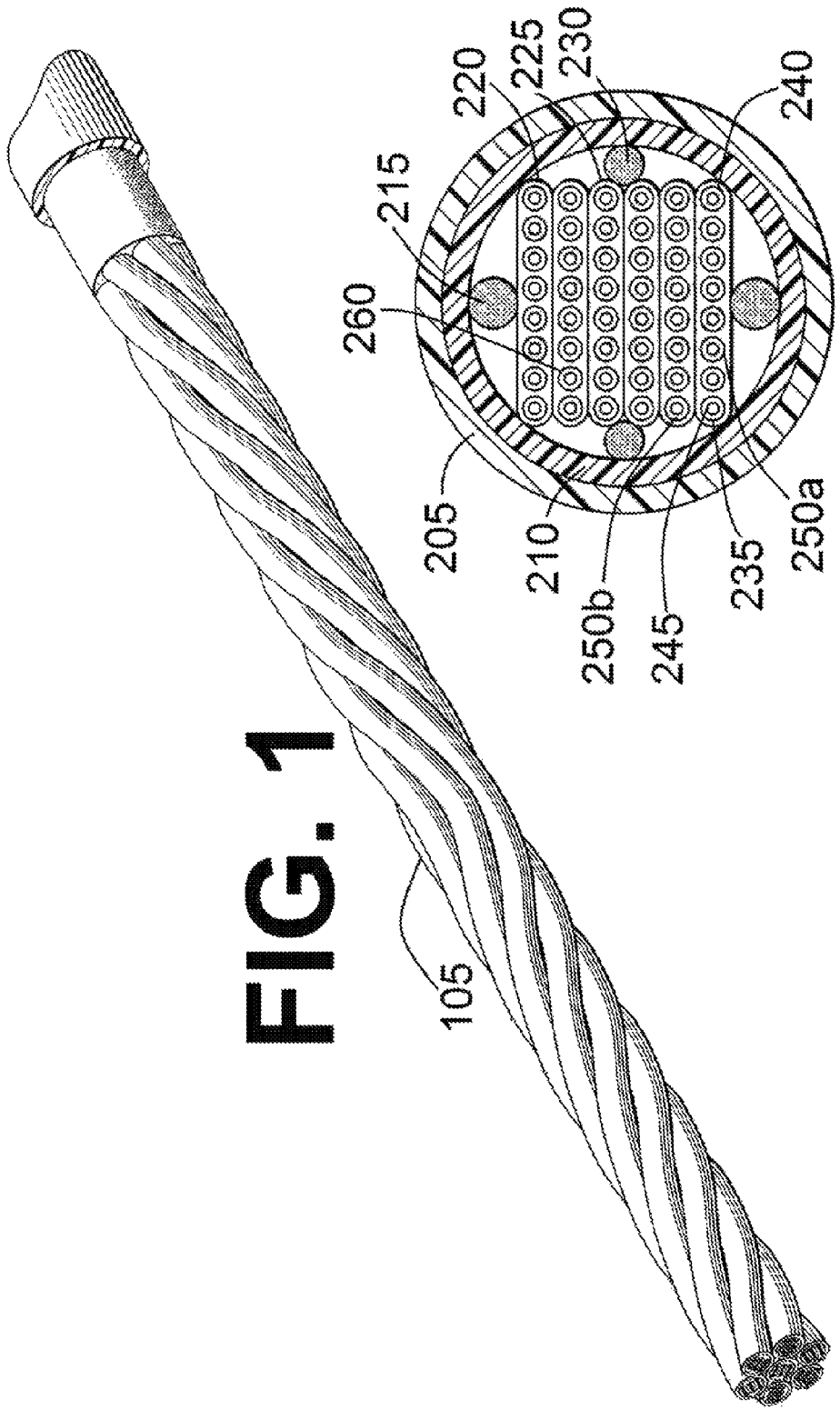
FIG. 1 is a diagram showing one embodiment of a cable with tubes that are twisted together in an SZ-configuration.
FIG. 2 is a diagram showing a cross-section of one embodiment of a cable with stacked optical fiber ribbons.

Conventional fiber-optic ribbon cables for outdoor applications have optical fibers with a 125-micrometer (µm) outer diameter glass cladding and a 250 µm outer diameter coating (also called 250-micron fiber or 250 µm fiber). The 250 µm optical fibers are typically singlemode fibers that comply with the International Telecommunication Union (ITU) Telecommunication Standardization Sector (ITU-T) Recommendation G.652 (ITU-T G.652). The G.652-compliant 250 µm fibers have coating thicknesses of approximately 62.5 µm, which provide sufficient cushioning for the glass (core and cladding) to limit attenuation of the optical signal. The cushioning coatings on the glass fibers help permit the cable to transmit information without errors while withstanding the effects of applied mechanical forces (e.g., tensile and compressive forces) as well as temperature changes found in the outdoor environment. These mechanical and environmental effects on optical cables in the field are modeled in the qualification tests laid out in the TIA 455 series of standards, better known as Fiber Optic Test Procedures, or FOTPs. The FOTPs are referenced in performance standards such as Telcordia GR-20 and ICEA-S-87-640. Examples of FOTPs that model cable performance in outdoor conditions include TIA-455-33, "Optical Fiber Cable Tensile Loading and Bending Test"; TIA-455-41, "Compressive Loading Resistance Test of Optical Fiber Cables"; and TIA-455-3, "Procedure to Measure Temperature Cycling Effects on Optical Fiber Units, Optical Cable, and Other Passive Fiber Components." Recently, increasing demands for data in mobile, commercial, and residential networks have resulted in a corresponding increase in demands for cables with higher fiber density because higher fiber density allows more data to be transmitted within the same right of way. One way to achieve higher fiber density is by reducing fiber coating thickness by, for example, using optical fibers with 125 µm outer diameter glass cladding and 200 µm outer diameter coatings (also called 200-micron fibers or 200 µm fibers) instead of 250 µm fibers. Unlike 250 µm fibers, 200 µm fibers have approximately forty percent (40%) less coating to provide cushioning of the glass fiber. Unfortunately, the thinner coatings (and reduced cushioning) of the 200 µm fibers result in greater macro-bend and micro-bend sensitivity (or lower bend-tolerance) than 250 µm fibers with identical waveguide structures.

The higher bend-sensitivity of 200 µm fibers becomes problematic when used in fiber-optic ribbon cables 105, such as that shown in FIG. 1. This is because the fiber-optic cables 105 have optical ribbons that are stacked together and twisted to average out geometric strains on fibers when the cable is bent during installation or service. Often, the ribbon stacks are twisted with either a continuous twist in one direction throughout the length of the cable (called an S-configuration (not shown in the drawings)), or a reverse-oscillating twist applied alternatingly clockwise and then counterclockwise (called an SZ-configuration, shown in FIG. 1). This twisting averages out bending strain on the ribbon stack when the cable is bent. Fibers on the corners or edges of the ribbon stack are subjected to compressive or shear forces when in contact with the wall of the core tube. Cables with higher bend-sensitive 200 µm fibers fail mechanical and environmental testing more often than cables with more bend-insensitive 250 µm fibers.

In order to overcome the problems with bend-sensitivity, conventionally-accepted wisdom teaches that only bending-loss insensitive optical fibers should be used throughout an optical ribbon cable when using 200 µm fibers. In other words, conventional wisdom teaches that all of the 200 µm optical fibers in an optical ribbon cable should have high bending-loss insensitive characteristics, such as optical fibers having depressed-clad refractive index profiles (e.g., AllWave FLEX+® fibers by OFS Fitel, LLC) or trench-assisted refractive index profiles (e.g., BendBright XS by Prysmian Group), both of which comply with ITU-T G.657.A2.

Unfortunately, ITU-T G.657.A2-compliant fibers are more expensive because of their complicated refractive index profiles. Thus, although wholesale substitution of ITU-T G.657.A2-compliant 200 µm fibers for ITU-T G.652-compliant 250 µm fibers results in higher fiber density, an optical cable with all-ITU-T G.657.A2-compliant fibers becomes a very expensive cable.

Composite cables, as shown by the various embodiments below, provide a solution to this problem. Specifically, the disclosed embodiments teach optical ribbon cables with higher fiber densities than conventional 250 μm-fiber cables while concurrently reducing costs as compared to all-ITU-T G.657.A2-compliant-fiber cables. The inventive composite cable accomplishes this by proceeding contrary to conventionally-accepted wisdom and using different types of optical fibers, namely 200 μm optical fibers that do not comply with ITU-T G.657.A2 in conjunction with strategically-located 200 μm fibers that do comply with ITU-T G.657.A2.

The strategic combination of different types of optical fibers results from the following observations. When stacks of optical ribbons within cables are twisted in S-configurations or SZ-configurations, optical fibers that are on the outer edges of the ribbon stack (edge fibers and corner fibers) have greater contact with other cable components than the optical fibers that are located internal to the stack (i.e., non-corner-non-edge fibers). Due to this increased contact with cable components, the corner fibers and the edge fibers experience greater micro-bending and macro-bending perturbations as compared to the internal fibers. Conversely, because the internal fibers have less contact with the cable components than the edge fibers or the corner fibers, the internal fibers are less affected by micro-bending and macro-bending than the edge fibers or the corner fibers.

Taking advantage of this discrepant effect on internal fibers as compared to edge fibers or corner fibers, one embodiment of the composite cable comprises a stack of optical fiber ribbons in which the internal fibers need only comply with ITU-T G.652, while the corner fibers comprise bend-insensitive ITU-T G.657.A2-compliant fibers. For another embodiment, the edges of the stack (in addition to the corners of the stack) also comprise bend-insensitive ITU-T G.657.A2-compliant fibers.

Having provided an overview of several embodiments of the invention, reference is now made in detail to the description of the embodiments as illustrated in FIG. 2. Although several embodiments are described in connection with these drawings, there is no intent to limit the disclosure to the embodiment or embodiments disclosed herein. On the contrary, the intent is to cover all alternatives, modifications, and equivalents.

FIG. 2 is a diagram showing a cross-section of one embodiment of a cable with stacked optical fiber ribbons 220. As shown in FIG. 2, the optical ribbon cable comprises stacks of optical fiber ribbons 220, 225. Because the ribbons 220, 225 form a stack, the ribbons located at the edge of the stack are called edge ribbons 220, while other ribbons located internal to the stack are called internal ribbons 225. For purposes of illustration, the stack in FIG. 2 comprises six (6) ribbons 220, 225, with each ribbon 220, 225 comprising eight (8) 200 μm optical fibers 240, 250a, 250b, 260, bringing the total number to forty-eight (48) optical fibers forming a substantially rectangular array. It should be noted that one or more ribbons 220, 225 can be removed or added to the stack to vary the size of the stack. Also, the number of optical fibers 240, 250a, 250b, 260 within each ribbon 220, 225 can be varied to increase or decrease the fiber count in each ribbon 220, 225.

Each of the optical fibers 240, 250a, 250b, 260 comprises a coating 235 surrounding silica 245 (the silica including the core (not labeled) and the cladding (not labeled)). Because of the demand for higher fiber density, the outer diameter of the coating 235 for all of the fibers is approximately 200 μm. With a cladding outer diameter that is approximately 125 μm, the coating 235 is approximately 37.5 μm thick.

As shown in FIG. 2, the stack of ribbons 220, 225 is located within a tube 210, which is surrounded by an outer jacket 205. The embodiment of FIG. 2 also shows strength rods 215, 230 running alongside the stack of ribbons 220, 225 in a direction parallel to the optical fibers 240, 250a, 250b, 260.

Of particular significance, corner fibers 240 are located at the ends of each edge ribbon 220, while edge fibers 250a form the remainder of the edge ribbon 220. Edge fibers 250b are also found at the ends of the internal ribbons 225. Consequently, the corner fibers 240 and the edge fibers 250a, 250b (collectively, 250) in FIG. 2 form a perimeter of fibers 240, 250 around the remaining fibers (denoted as internal fibers 260).

When the ribbon stack within the fiber-optic cable is twisted into an S-configuration or an SZ-configuration, the corner fibers 240 and edge fibers 250 experience more macro-bending and micro-bending than the internal fibers 260. Thus, to accommodate this difference and also to accommodate the desire for higher fiber density, some embodiments of the fiber-optic cable comprise a stack of optical fiber ribbons 220, 225 with 200 μm internal fibers 260 that are compliant with ITU-T G.652.D and 200 μm corner fibers that are compliant with ITU-T G.657.A2. The 200 μm corner fibers 240 exhibit a lower bend-sensitivity than the 200 μm ITU-T G.652.D-compliant internal fibers 260.

For some embodiments, if there is only a marginal micro-bending or macro-bending effect at the edge of the stack, then lower-bend-tolerant ITU-T G.652.D fibers are selected for the 200 μm edge fibers 250. For other embodiments, if the edge of the stack exhibits a large degree of micro-bending or macro-bending, then ITU-T G.657.A2 fibers or ITU-T G.676.A1 fibers are selected as the 200 μm edge fibers 250. It should be appreciated that, for other embodiments that meet stricter standards, the 200 μm internal fibers 260 are ITU-T G.657.A1-compliant fibers, while the 200 μm corner fibers 240 are ITU-T G.657.A2-compliant fibers that have a higher bend-insensitivity than the internal fibers 260. At bottom, the inventive composite cable comprises corner fibers 240 that have a higher bend-tolerance (or bend-insensitivity) than internal fibers 260.

Although a single tube 210 is shown in FIG. 2, it should be appreciated that, for other embodiments, the fiber-optic cable comprises multiple tubes that are twisted together in either an S-configuration or an SZ-configuration, with all of the tubes being covered by an outer jacket. For such an embodiment, each tube comprises a stack of optical fiber ribbons, with each stack comprising internal fibers, edge fibers, and corner fibers. The corner fibers have a lower sensitivity to bending than the internal fibers. Additionally, depending on the degree of micro-bending or macro-bending, the edge fibers have higher bend-tolerance than the internal fibers or lower bend-tolerance than the corner fibers.

By proceeding contrary to conventionally-accepted wisdom and combining optical fibers with different bend-sensitivities within the same fiber-optic cable, the disclosed embodiments provide a solution that is more cost-effective than a fiber-optic cable with all ITU-T G.657.A2-compliant fibers. Furthermore, the disclosed fiber-optic cables (comprising 200 μm optical fibers with different bend-tolerances) provide a higher-fiber-density solution than conventional cables with 250 μm fibers.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A fiber-optic cable comprising:
   (a) a tube;
   (b) a stack of optical fiber ribbons located in the tube, the stack comprising:
      (b1) a corner fiber located at a corner of the stack, the corner fiber comprising a coating having an outer diameter that is approximately 200 micrometers, the corner fiber being compliant with ITU-T G.657.A2;
      (b2) an edge fiber located at an edge of the stack, the edge fiber comprising a coating having an outer diameter that is approximately 200 micrometers; and
      (b3) an internal fiber located within the stack, the internal fiber having a higher sensitivity to bending than the corner fiber, the internal fiber comprising a coating having an outer diameter that is approximately 200 micrometers, the internal fiber being compliant with ITU-T G.652.D;
   (c) a strength rod located parallel to the tube; and
   (d) an outer jacket surrounding the stack, the tube, and the strength rod.

2. The cable of claim 1, the edge fiber being complaint with ITU-T G.652.D.

3. The cable of claim 1, the edge fiber being complaint with ITU-T G.657.A1.

4. The cable of claim 1, the edge fiber being complaint with ITU-T G.657.A2.

5. The cable of claim 1, the internal fiber further being complaint with ITU-T G.657.A1.

6. A fiber-optic cable comprising:
   a stack of optical fiber ribbons;
   an internal fiber located within the stack, the internal fiber comprising a coating having an outer diameter that is approximately 200 micrometers, the internal fiber being compliant with ITU-T G.652.D;
   a corner fiber located at a corner of the stack, the corner fiber having a lower sensitivity to bending than the internal fiber, the corner fiber comprising a coating having an outer diameter that is approximately 200 micrometers, the corner fiber being compliant with ITU-T G.657.A2; and
   an edge fiber located at an edge of the stack, the edge fiber comprising a coating having an outer diameter that is approximately 200 micrometers.

7. The cable of claim 6, the edge fiber being complaint with ITU-T G.652.D.

8. The cable of claim 6, the edge fiber being complaint with ITU-T G.657.A1.

9. The cable of claim 6, the edge fiber being complaint with ITU-T G.657.A2.

10. The cable of claim 6, the internal fiber further being complaint with ITU-T G.657.A1.

* * * * *